United States Patent
Lin et al.

(10) Patent No.: US 8,717,695 B1
(45) Date of Patent: May 6, 2014

(54) CHARACTERIZING HEAD PARAMETERS OF A DISK DRIVE BY EVALUATING TRACK PROFILE OF AN OVERWRITTEN TRACK

(75) Inventors: Enhao Lin, Union City, CA (US); Shaoping Li, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 129 days.

(21) Appl. No.: 13/408,921

(22) Filed: Feb. 29, 2012

(51) Int. Cl.
*G11B 27/10* (2006.01)

(52) U.S. Cl.
USPC .............................................. 360/31

(58) Field of Classification Search
CPC ...................................... G11B 27/36
USPC ........ 360/31, 75, 69, 51, 77.02, 77.01, 77.08, 360/21; 369/53.22, 47.27, 275.3, 47.42
See application file for complete search history.

(56) References Cited

U.S. PATENT DOCUMENTS

| | | | |
|---|---|---|---|
| 4,513,333 | A | 4/1985 | Young et al. |
| 4,516,165 | A | 5/1985 | Cunningham et al. |
| 4,979,051 | A * | 12/1990 | Eggebeen ........................ 360/21 |
| 5,600,500 | A | 2/1997 | Madsen et al. |
| 5,687,036 | A | 11/1997 | Kassab |
| 5,691,857 | A | 11/1997 | Fitzpatrick et al. |
| 5,812,337 | A | 9/1998 | Tanaka et al. |
| 6,028,731 | A | 2/2000 | Bond |
| 6,101,053 | A | 8/2000 | Takahashi |
| 6,166,536 | A | 12/2000 | Chen et al. |
| 6,252,731 | B1 | 6/2001 | Sloan et al. |
| 6,265,868 | B1 | 7/2001 | Richter |
| 6,445,521 | B1 | 9/2002 | Schaff et al. |
| 6,476,992 | B1 | 11/2002 | Shimatani |
| 6,525,892 | B1 | 2/2003 | Dunbar et al. |
| 6,680,609 | B1 | 1/2004 | Fang et al. |
| 6,765,379 | B1 | 7/2004 | Marshall et al. |
| 6,791,775 | B2 | 9/2004 | Li et al. |
| 6,870,697 | B2 | 3/2005 | Ikekame et al. |
| 6,909,566 | B1 | 6/2005 | Zaitsu et al. |
| 6,914,738 | B2 | 7/2005 | Fujiwara et al. |
| 6,995,933 | B1 | 2/2006 | Codilian et al. |
| 7,095,577 | B1 | 8/2006 | Codilian et al. |
| 7,119,537 | B2 | 10/2006 | Che et al. |
| 7,170,700 | B1 | 1/2007 | Lin et al. |
| 7,203,023 | B2 | 4/2007 | Kuroda et al. |
| 7,227,708 | B2 | 6/2007 | Feng |
| 7,529,050 | B2 | 5/2009 | Shen et al. |
| 7,567,397 | B2 | 7/2009 | Lu |

(Continued)

OTHER PUBLICATIONS

Juan Fernandez-De-Castro, et al., "Measuring and Understanding Write Width and Off-Track as a Function of Linear Density in Perpendicular Recording", JAP, 111, 07B702 (2012).

(Continued)

*Primary Examiner* — Nabil Hindi

(57) ABSTRACT

A disk drive is disclosed comprising a disk comprising a plurality of tracks, and a head actuated over the disk. The head is positioned over a track while writing a first frequency pattern substantially centered on the track at a first frequency. After writing the first frequency pattern, a second frequency pattern is written substantially centered on the track at a second frequency, wherein the second frequency pattern is written over the first frequency pattern. After writing the second frequency pattern over the first frequency pattern, the head is scanned across the track while reading the disk to generate a read signal. A first frequency component is extracted from the read signal representing the first frequency.

26 Claims, 5 Drawing Sheets

(56) References Cited

U.S. PATENT DOCUMENTS

| | | |
|---|---|---|
| 7,667,933 B2 | 2/2010 | Kudo et al. |
| 7,706,096 B2 | 4/2010 | Ito et al. |
| 7,729,071 B2 | 6/2010 | Harada |
| 7,843,658 B2 * | 11/2010 | Kiyono .......................... 360/31 |
| 7,907,361 B2 | 3/2011 | Deng et al. |
| 7,982,989 B1 * | 7/2011 | Shi et al. ....................... 360/31 |
| 8,120,867 B2 * | 2/2012 | Brady et al. ................... 360/31 |
| 8,441,904 B2 * | 5/2013 | Brady et al. ............... 369/53.44 |
| 2004/0010391 A1 | 1/2004 | Cheng-I Fang et al. |
| 2004/0075931 A1 | 4/2004 | Kim et al. |
| 2004/0080845 A1 | 4/2004 | Yeo et al. |
| 2006/0098318 A1 | 5/2006 | Feng |

OTHER PUBLICATIONS

Juan Fernandez-De-Castro, et al., "Charaterization of the Reader Width Using the Micro-Track Test in Perpendicular Recording", IEEE Transactions on Magnetics, vol. 48, No. 7, Jul. 2012, pp. 2158-2160.

Enhao Ed Lin, et al., "High Precision Erase Band Measurement With Four Written Tracks", IEEE Transactions on Magnetics, vol. 47, No. 10, Oct. 2011, pp. 2984-2987.

* cited by examiner

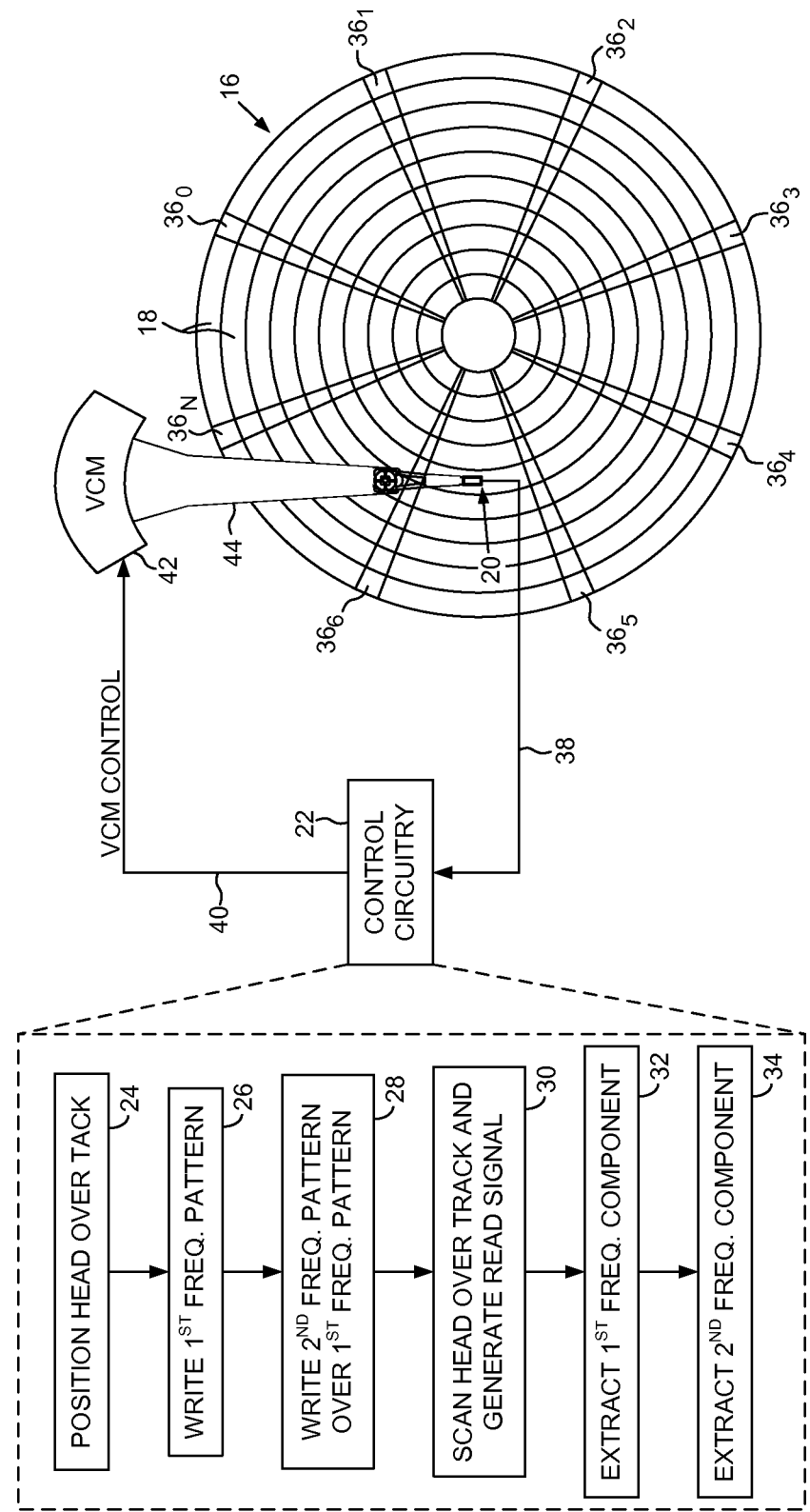

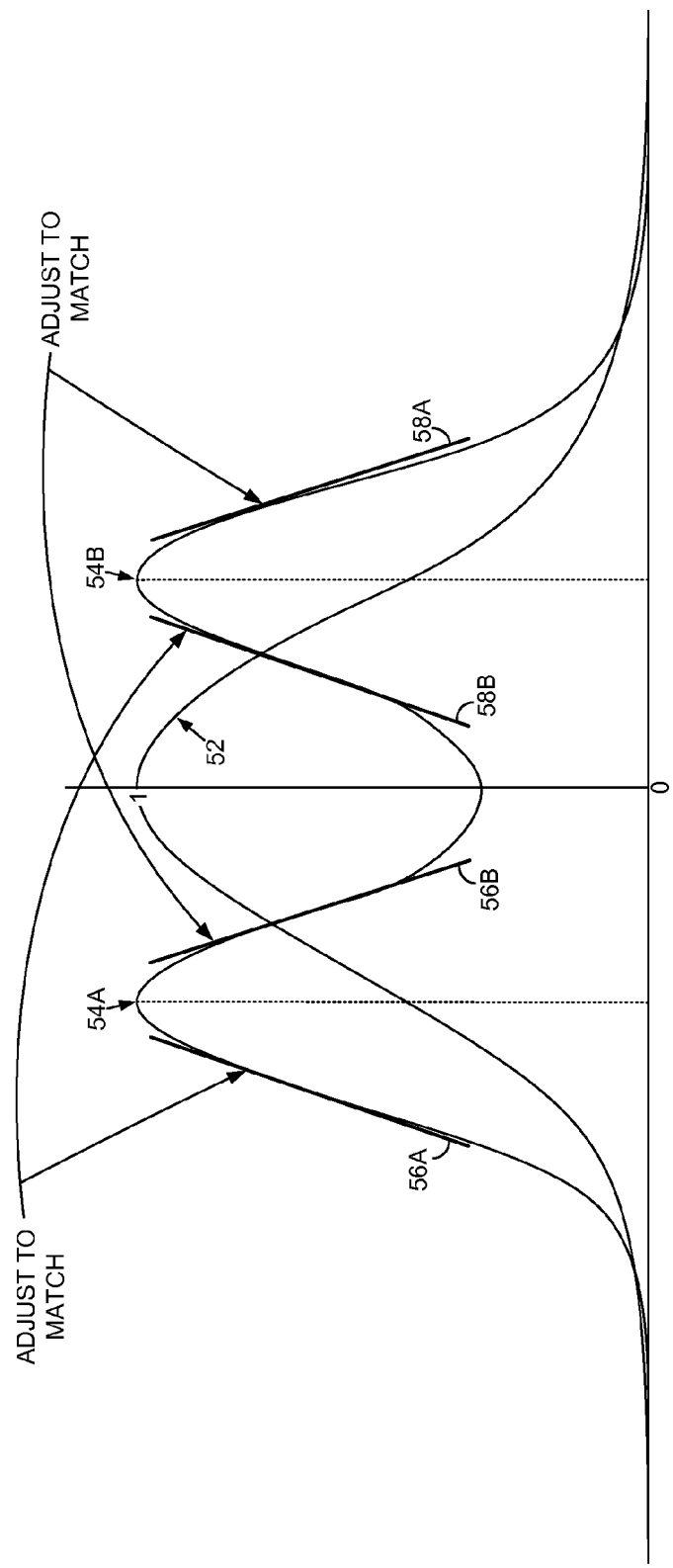

CHARACTERIZING HEAD PARAMETERS OF A DISK DRIVE BY EVALUATING TRACK PROFILE OF AN OVERWRITTEN TRACK

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of servo tracks 6 defined by servo sectors $4_0$-$4_N$ recorded around the circumference of each servo track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 4, further comprises groups of servo bursts 14 (A, B, C, D in the example shown), which are recorded with precise intervals and offsets relative to the track centerlines. The servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein after overwriting a first frequency pattern with a second frequency pattern, the first and second frequencies are extracted to generate a track profile.

FIG. 5 shows an embodiment of the present invention wherein the track profile is adjusted so that the corresponding slopes of first and second side pulses substantially match.

DETAILED DESCRIPTION

Figure 1:
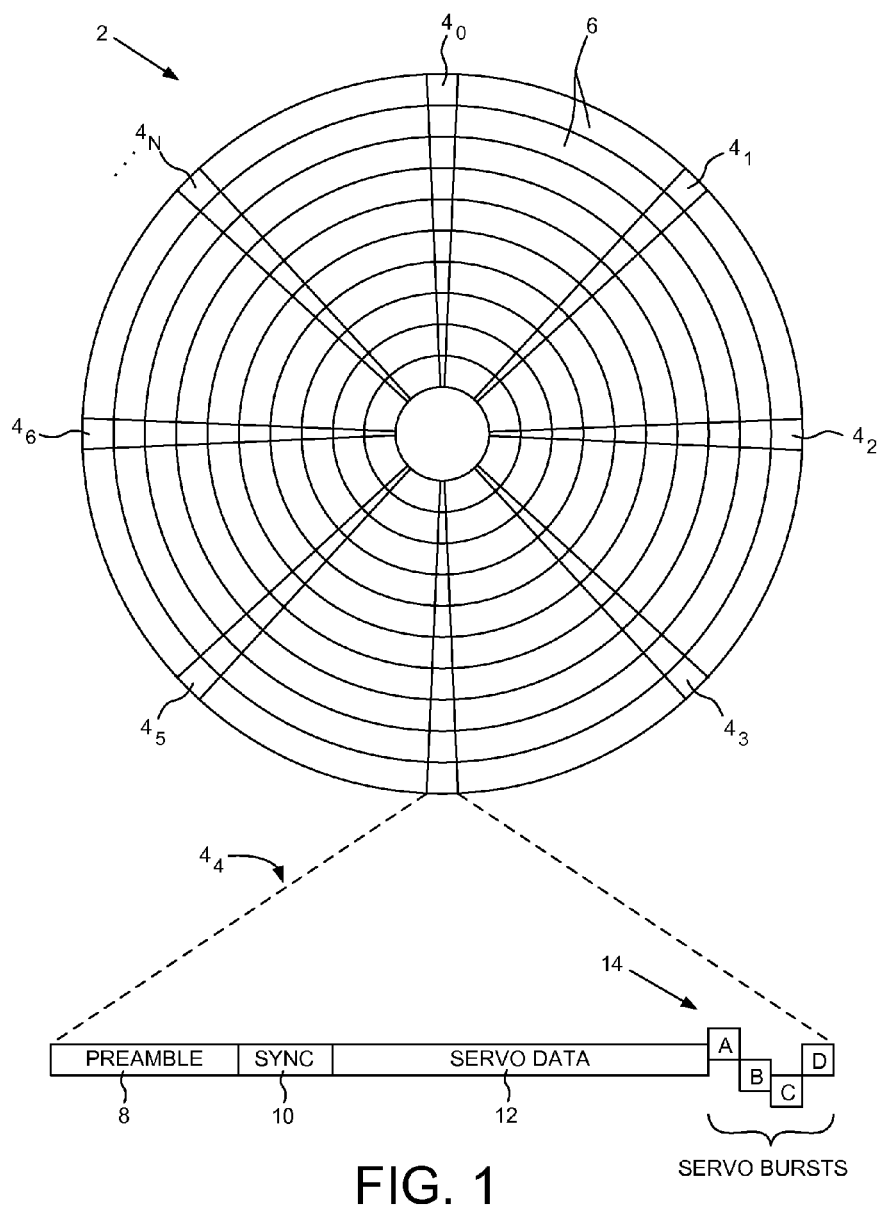
FIG. 1 shows a prior art disk format comprising a plurality of servo tracks defined by servo sectors.

FIG. 2A shows a disk drive according to an embodiment of the present invention comprising a disk 16 comprising a plurality of tracks 18, and a head 20 actuated over the disk 16. The disk drive further comprises control circuitry 22 operable to execute the flow diagram of FIG. 2B, wherein the head is positioned over a track (block 24) while writing a first frequency pattern substantially centered on the track at a first frequency (block 26). After writing the first frequency pattern, a second frequency pattern is written substantially centered on the track at a second frequency (block 28), wherein the second frequency pattern is written over the first frequency pattern. After writing the second frequency pattern over the first frequency pattern, the head is scanned across the track while reading the disk to generate a read signal (block 30). A first frequency component is extracted from the read signal representing the first frequency (block 32), and a second frequency component is extracted from the read signal representing the second frequency (block 34).

In the embodiment of FIG. 2A, the disk 16 comprises embedded servo sectors $36_0$-$36_N$ that define the tracks 18. The control circuitry 22 processes a read signal 38 emanating from the head 20 to demodulate the servo sectors $36_0$-$36_N$ and generate a position error signal (PES) representing an error between the actual position of the head and a target position relative to a target track. The control circuitry 22 filters the PES using suitable compensation filters to generate a control signal 40 applied to a voice coil motor (VCM) 42 which rotates an actuator arm 44 about a pivot, thereby actuating the head 20 radially over the disk 16 in a direction that reduces the PES. The servo sectors $36_0$-$36_N$ may comprise any suitable position information, such as a track address for coarse positioning and servo bursts for fine positioning as described above with reference to FIG. 1. The servo bursts may comprise any suitable pattern, such as an amplitude based servo pattern as shown in FIG. 1, or a suitable phase based servo pattern.

Figures 3A, 3B, 3C:
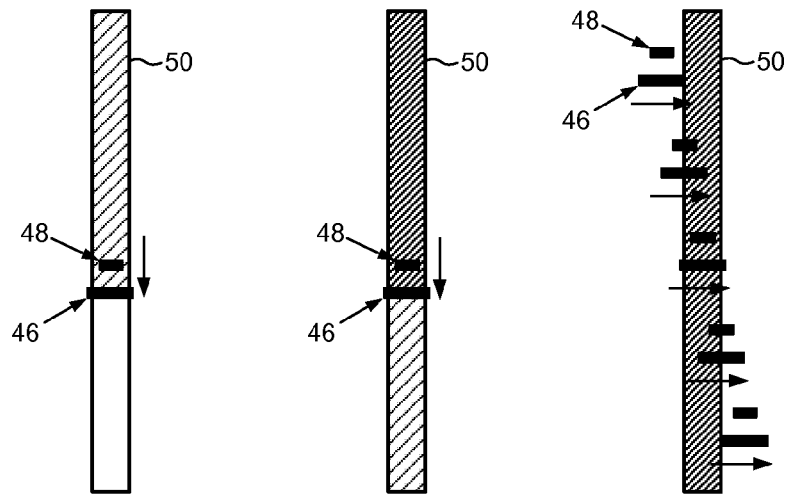
FIGS. 3A-3D illustrate an embodiment of the present invention wherein the head is scanned over the track after overwriting the first frequency pattern with the second frequency pattern in order to generate the track profile.

FIGS. 3A-3C graphically illustrate the flow diagram of FIG. 2B, wherein the head 20 comprises a write element 46 and a read element 48. The read element 48 is used to read the servo sectors $36_0$-$36_N$ in order to position the write element 46 over the center of a track 50 while writing the first frequency pattern during a first revolution of the disk as illustrated in FIG. 3A. During a second revolution of the disk and while the write element 46 remains substantially centered over the track 50 the second frequency pattern overwrites the first frequency pattern as shown in FIG. 3B. In one embodiment, the second frequency may be higher than the first frequency by any suitable delta, and in another embodiment, the first frequency may be higher than the second frequency by any suitable delta. After overwriting the first frequency pattern with the second frequency pattern, the read element 48 is scanned over the track while reading the track as illustrated in FIG. 3C in order to generate a track profile as shown in FIG. 3D.

Figure 3D:
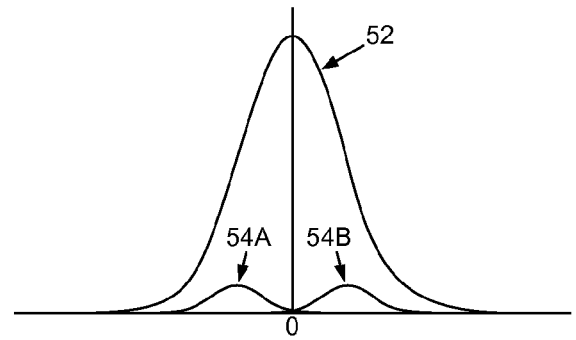

The track profile shown in FIG. 3D comprises a center pulse 52 with a peak at the center of the track that is generated by filtering the read signal in order to extract the second frequency component representing the second frequency according to an embodiment. The track profile also comprise a first side pulse 54A on a first side of the track and a second side pulse 54B on a second side of the track, wherein the first and second side pulses represent a signal strength of the read signal at the first frequency. The first and second side pulses 54A and 54B of the track profile are generated by filtering the read signal in order extract the first frequency component. The first and second side pulses 54A and 54B are smaller in amplitude than the center pulse as they represent the residual signal of the first frequency pattern after having been overwritten by the second frequency pattern.

Figure 4:
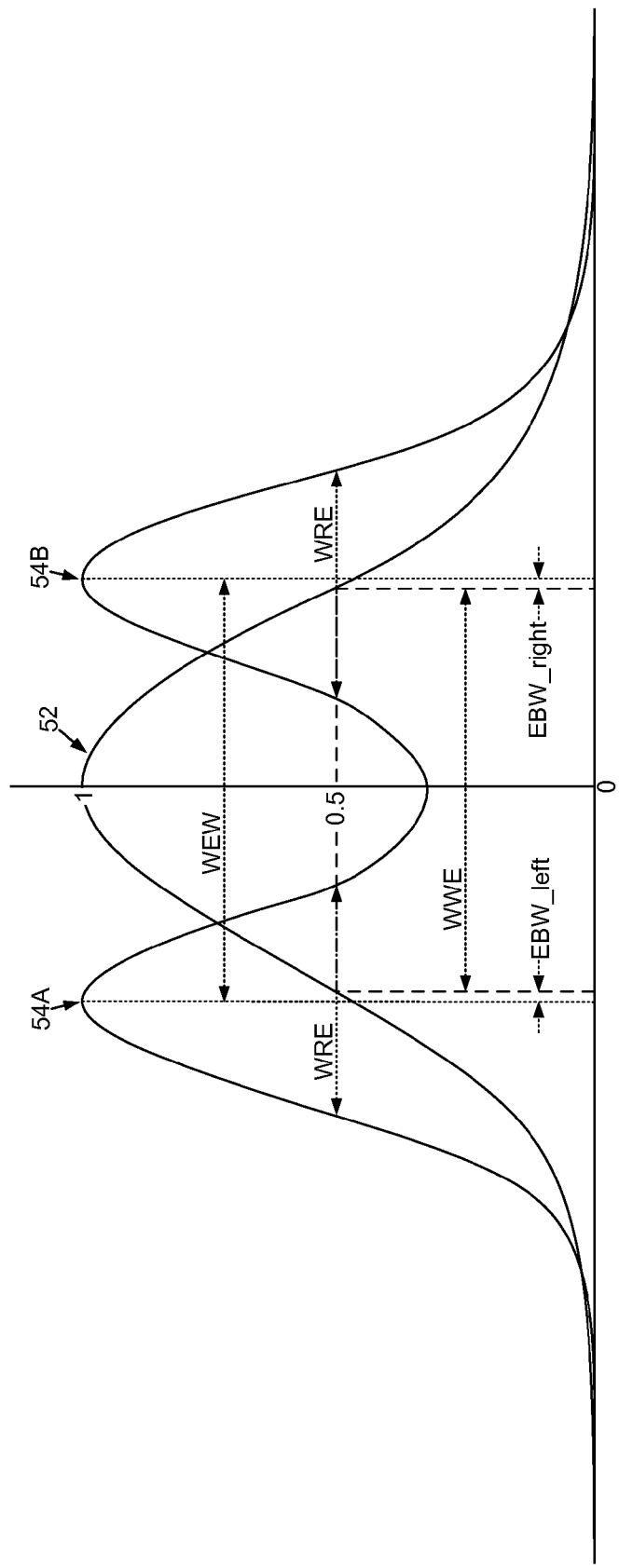
FIG. 4 shows an example track profile generated by scanning the head over the track and extracting the first and second frequencies according to an embodiment of the present invention.

In one embodiment, the center pulse 52 and the first and second side pulses 54A and 54B are normalized as shown in FIG. 4. After normalizing the track profile, in one embodiment the control circuitry 22 estimates a head parameter in response to the center pulse 52 and the first and second side pulses 54A and 54B. Any suitable head parameter may be estimated in response to the track profile shown in FIG. 4. In one embodiment, the control circuitry 22 estimates a width of the read element (WRE) in response to at least one of the first and second side pulses 54A and 54B. For example, in one embodiment the control circuitry 22 estimates the WRE based on a width of at least one of the first and second side pulses. In another embodiment, the control circuitry 22 estimates a write and erase width (WEW) of the head based on a distance between the first and second side pulses as shown in FIG. 4. In yet another embodiment, the control circuitry 22 estimates a width of the write element (WWE) in response to the center pulse. In still another embodiment, the control circuitry estimates an erase band width (EBW) of the head based on a difference between the WEW and the WWE as shown in FIG. 4.

In one embodiment, the write element 46 is radially offset from the read element 48 (FIG. 3A), wherein the control circuitry may estimate the radial offset between the write element 46 and the read element 48 based on the WEW. For example, the center of the WEW may represent the center of the track with respect to the read element 48, whereas the center of the track with respect to the write element 46 may be determined by the location of the read element 48 while writing the first and second frequency patterns to the track. The difference between the respective track centers may represent the radial offset between the write element 46 and the read element 48.

In one embodiment, the outer slopes 56A and 58A of the first and second side pulses 54A and 54B shown in FIG. 5 may provide a better signal in the track profile as compared to the inner slopes 56B and 58B. This may be due to the signal strength of the second frequency pattern overwriting the first frequency pattern near the center of the track. In one embodiment, the first and second side pulses 54A and 54B are expected to have symmetry relative to one another. Accordingly, in one embodiment asymmetrical error between the first and second side pulses 54A and 54B may be corrected by adjusting the inner slopes of each side pulse so as to substantially match the outer slope of the other side pulse as illustrated in FIG. 5. That is, the inner slope 56B of the first side pulse 54A may be adjusted to substantially match the outer slope 58A of the second side pulse 54B, and the inner slope 58B of the second side pulse 54B may be adjusted to substantially match the outer slope 56A of the first side pulse 54A. In one embodiment, adjusting the slopes of the side pulses in this manner improves the estimate of the head parameters described above.

In some embodiments, the tracks 18 shown in FIG. 2A may be defined in any suitable manner relative to the servo sectors $36_0$-$36_N$. In one embodiment, the servo sectors $36_0$-$36_N$ define servo tracks that may have the same or different radial density as the tracks 18 shown in FIG. 2A. In addition, the track that the head 20 is positioned over at block 24 of FIG. 2B may be defined at any suitable radial location relative to the servo sectors $36_0$-$36_N$. For example, if the control circuitry 22 defines data tracks relative to servo tracks, the track that the head 20 is positioned over at block 24 of FIG. 2B may be a servo track or a data track. In another embodiment, the track the head 20 is positioned over at block 24 of FIG. 2B may be a calibration track having a center defined relative to (offset from) the center of a corresponding data track or servo track as determined from the servo sectors $36_0$-$36_N$.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk; and
   control circuitry operable to:
   position the head over a track;
   write a first frequency pattern substantially centered on the track at a first frequency;
   after writing the first frequency pattern, write a second frequency pattern substantially centered on the track at a second frequency, wherein the second frequency pattern is written over the first frequency pattern;
   after writing the second frequency pattern over the first frequency pattern, scan the head across the track while reading the disk to generate a read signal; and
   extract a first frequency component from the read signal representing the first frequency.

2. The disk drive as recited in claim 1, wherein the second frequency is higher than the first frequency.

3. The disk drive as recited in claim 1, wherein the first frequency is higher than the second frequency.

4. The disk drive as recited in claim 1, wherein the control circuitry is further operable to
   extract the first frequency component by generating a first side pulse on a first side of the track and a second pulse on a second side of the track, wherein the first and second side pulses represent a signal strength of the read signal at the first frequency.

5. The disk drive as recited in claim 4, wherein:
   the head comprises a write element and a read element; and
   the control circuitry is further operable to estimate a head parameter in response to the first and second side pulses.

6. The disk drive as recited in claim 5, wherein the control circuitry is further operable to estimate a width of the read element (WRE) in response to at least one of the first and second side pulses.

7. The disk drive as recited in claim 6, wherein the control circuitry is further operable to estimate the WRE based on a width of at least one of the first and second side pulses.

8. The disk drive as recited in claim 5, wherein the control circuitry is further operable to estimate a write and erase width (WEW) of the head based on a distance between the first and second side pulses.

9. The disk drive as recited in claim 5, wherein the control circuitry is further operable to:
   extract a second frequency component from the read signal to generate a center pulse at a center of the track representing a signal strength of the read signal at the second frequency; and estimate a width of the write element (WWE) in response to the center pulse.

10. The disk drive as recited in claim 9, wherein the control circuitry is further operable to estimate a write and erase width (WEW) of the head based on a distance between the first and second side pulses.

11. The disk drive as recited in claim 10, wherein the control circuitry is further operable to estimate an erase band width (EBW) of the head based on a difference between the WEW and the WWE.

12. The disk drive as recited in claim 8, wherein the control circuitry is further operable to estimate a radial offset between the write element and the read element based on the WEW.

13. The disk drive as recited in claim 5, wherein the control circuitry is further operable to:
   estimate a first slope of a first side of the first side pulse;
   estimate a second slope of a second side of the second side pulse; and
   estimate the head parameter in response to the first and second slopes.

14. A method of operating a disk drive comprising, the disk drive comprising a disk comprising a plurality of tracks, and a head actuated over the disk, the method comprising:
   positioning the head over a track;
   writing a first frequency pattern substantially centered on the track at a first frequency;
   after writing the first frequency pattern, writing a second frequency pattern substantially centered on the track at a second frequency, wherein the second frequency pattern is written over the first frequency pattern;
   after writing the second frequency pattern over the first frequency pattern, scanning the head across the track while reading the disk to generate a read signal; and
   extracting a first frequency component from the read signal representing the first frequency.

15. The method as recited in claim 14, wherein the second frequency is higher than the first frequency.

16. The method as recited in claim 14, wherein the first frequency is higher than the second frequency.

17. The method as recited in claim 14, further comprising extracting the first frequency component by generating a first side pulse on a first side of the track and a second pulse on a second side of the track, wherein the first and second side pulses represent a signal strength of the read signal at the first frequency.

18. The method as recited in claim 17, wherein:
   the head comprises a write element and a read element; and
   the method further comprises estimating a head parameter in response to the first and second side pulses.

19. The method as recited in claim 18, further comprising estimating a width of the read element (WRE) in response to at least one of the first and second side pulses.

20. The method as recited in claim 19, further comprising estimating the WRE based on a width of at least one of the first and second side pulses.

21. The method as recited in claim 18, further comprising estimating a write and erase width (WEW) of the head based on a distance between the first and second side pulses.

22. The method as recited in claim 18, further comprising:
   extracting a second frequency component from the read signal to generate a center pulse at a center of the track representing a signal strength of the read signal at the second frequency; and
   estimating a width of the write element (WWE) in response to the center pulse.

23. The method as recited in claim 22, further comprising estimating a write and erase width (WEW) of the head based on a distance between the first and second side pulses.

24. The method as recited in claim 23, further comprising estimating an erase band width (EBW) of the head based on a difference between the WEW and the WWE.

25. The method as recited in claim 21, further comprising estimating a radial offset between the write element and the read element based on the WEW.

26. The method as recited in claim 18, further comprising:
   estimating a first slope of a first side of the first side pulse;
   estimating a second slope of a second side of the second side pulse; and
   estimating the head parameter in response to the first and second slopes.

* * * * *